A. Trim,
Wind Wheel,
No. 43,049.     Fig. 1     Patented June 7, 1864.
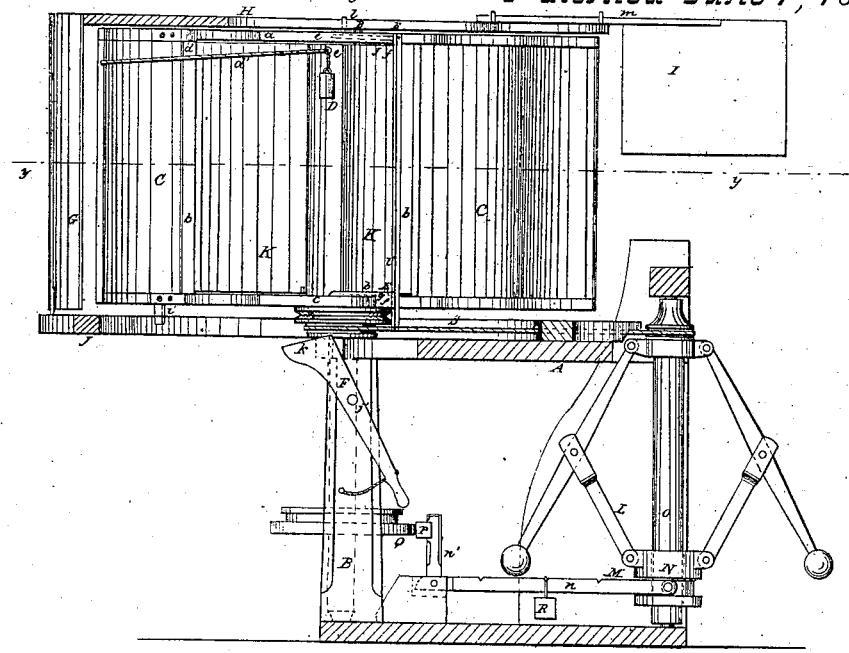
Fig. 2
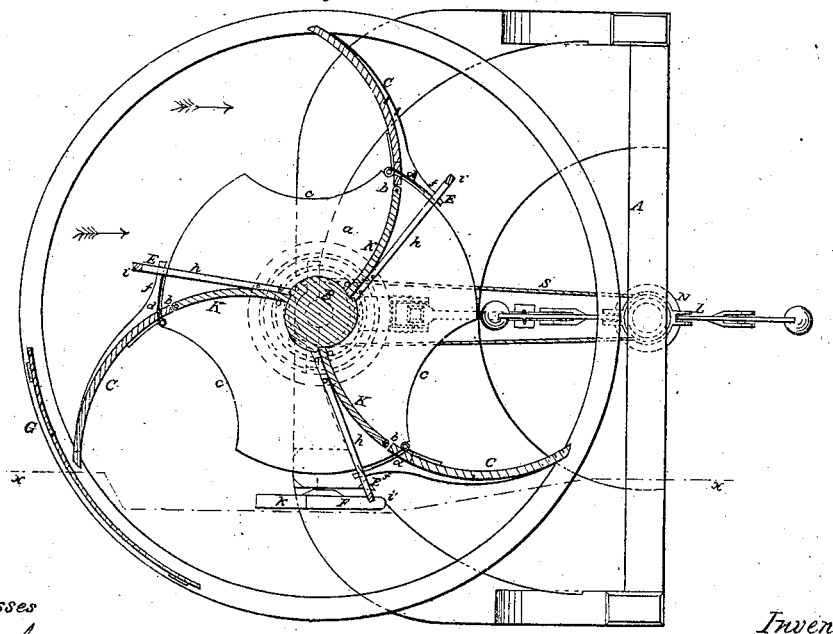
Witnesses
J. W. Coombs
Henry Morris
Inventor
Alfred Trim
per [his] attorney

UNITED STATES PATENT OFFICE.

ALFRED TRIM, OF ICONIUM, IOWA.

IMPROVEMENT IN WIND-WHEELS.

Specification forming part of Letters Patent No. 43,049, dated June 7, 1864.

*To all whom it may concern:*

Be it known that I, ALFRED TRIM, of Iconium, in the county of Appanoose and State of Iowa, have invented a new and Improved Wind-Wheel; and I do hereby declare that the following is a full, clear, and exact description of the same, reference being had to the accompanying drawings, making a part of this specification, in which—

Figure 1 is a side sectional view of my invention, taken in the line $x\ x$, Fig. 2; Fig. 2, a horizontal section of the same, taken in the line $y\ y$, Fig. 1.

Similar letters of reference indicate corresponding parts in the two figures.

This invention relates to a new and improved wind-wheel, such as is placed on a vertical shaft.

The object of the invention is to obtain a wind-wheel of the class specified which will operate perfectly in whatever direction the wind may be, and one which will admit of being very readily rendered inoperative when desired, and when in operation rotate with an equal or uniform speed.

To enable others skilled in the art to fully understand and construct my invention, I will proceed to describe it.

A represents a framing, which may be constructed in any proper manner, to support the working parts of the device, and B is an upright shaft in the framing A, to which shaft the wind-wheel is attached. This wind-wheel is composed of two horizontal disks, $a\ a'$, attached permanently to the shaft B, and having uprights $b$ secured between them near their edges. The disks $a\ a'$ may be described as being formed of circular plates scalloped out at their edges to form concave recesses $c$, as shown clearly in Fig. 2.

C represents the wings or sails of the wind-wheel, which are of curved form in their horizontal section, and are attached by hinges or joints $d$ to the peripheries of the disks $a\ a'$. These hinges or joints may be constructed in any proper way which will admit of the wings or sails swinging freely out from and to the disks $a\ a'$, and to each wing or sail there is attached, by a cord, $d'$, a weight, D, said cords passing through eyes $e$ or over pulleys at the under side of the upper disk, $a$, near the shaft B. These weights D have a tendency to keep the wings or sails in contact with the edges of the disks $a\ a'$. The back ends of the wings or sails have arms $f$ attached, one at their upper and the other at their lower ends, and these arms prevent the wings or sails from swinging out from the disks beyond the neccessary or required distance. The arms $f$, besides effecting this result, also serve, in connection with spring-catches E, to hold the wings or sails outward from the disks $a\ a'$. These spring-catches E are formed by having projections $g$ on spring rods $h$, the latter being attached to the disks $a\ [a'$, the outer ends of the rods $h$ of each wing or sail being connected by bars $i$, as shown clearly in Fig. 1. Whenever a wing or sail is forced outward from the disks $a\ a'$, the arms $f$ catch under the projections $g$, as will be understood by referring to Fig. 1. The wings or sails C may be released from the catches E at any time by adjusting a bar, F, which is attached to the framing A by a pivot, $j$, and has an inclined upper surface, $k$, over which the lower ends of the bars $i$ pass, the latter being raised thereby, so as to free the arms $f$ from the projections $g$. (See Fig. 1.)

G represents a shield, which is composed of a vertical segment or curved plate attached at its upper end to a horizontal plate, H, which turns freely on a pin, L, at the upper end of the shaft B. This plate H has an arm, $m$, projecting from it, to which a vane, I, is attached, and the lower end of the segment or curved plate or shield G may rest upon a circle or annular plate, J. The shield G is at the outer side of the wind-wheel, and at such a distance from it as just to clear the extended wings or sails, and the wind, by means of the vane I, will always keep one side of the front of the wheel covered by the shield, so that the wind can only act against the wings or sails at one side of the wheel, and thereby insure the rotation of the same. When the wings or sails are forced open or distended by the wind, they are retained in an open or extended state by the catches E until the bar F is adjusted to release them, when they are closed by the weights D. Within the wheel there are permanently-secured wings or sails K, which are also of curved form in their horizontal section, corresponding to the curvature of the swinging wings or sails C, as shown clearly in Fig. 2.

L represents a ball-governor, which is placed in the framing A, and has the long arm $n$ of a bent lever, M, connected to its lower end by means of a fork fitting in a groove in a pulley, N, on the governor shaft O. The short arm $n'$ of this lever M has a shoe, P, attached to it to bear against a wheel, Q, on the wind-wheel shaft B when the long arm $n$ of the lever M is raised under the action of the governor. The speed of the wind-wheel is rendered uniform by means of this governor and brake, and the long arm $n$ of the lever M has a weight, R, upon it, by adjusting which the action of the governor upon the lever M may be regulated so as to govern the speed of the wheel, as may be desired. For instance, if the weight R be adjusted near the short arm $n'$ of the lever, the governor will actuate the brake under a less speed of the wheel than if the weight were placed nearer the governor shaft, as in the latter case the weight offers a greater resistance to the action of the governor.

The governor may be driven by a belt, S, from the wind-wheel shaft.

Having thus described my invention, what I claim as new, and desire to secure by Letters Patent, is—

1. The swinging wings or sails C, having the weights D connected with them, in combination with the adjustable shield G, all arranged to operate substantially as and for the purpose herein set forth.

2. The ball-governor L, in combination with the bent lever M, provided with the adjustable weight R, and the pulley Q on the wind-wheel shaft B, substantially as and for the purpose herein set forth.

3. The catches E, in connection with the arms $f$ on the wings or sails C, and the adjustable bar F, attached to the framing A, all arranged substantially as and for the purpose herein specified.

ALFRED TRIM.

Witnesses:
W. S. HOGE,
H. B. WILLINGHAM.